Patented Apr. 14, 1931

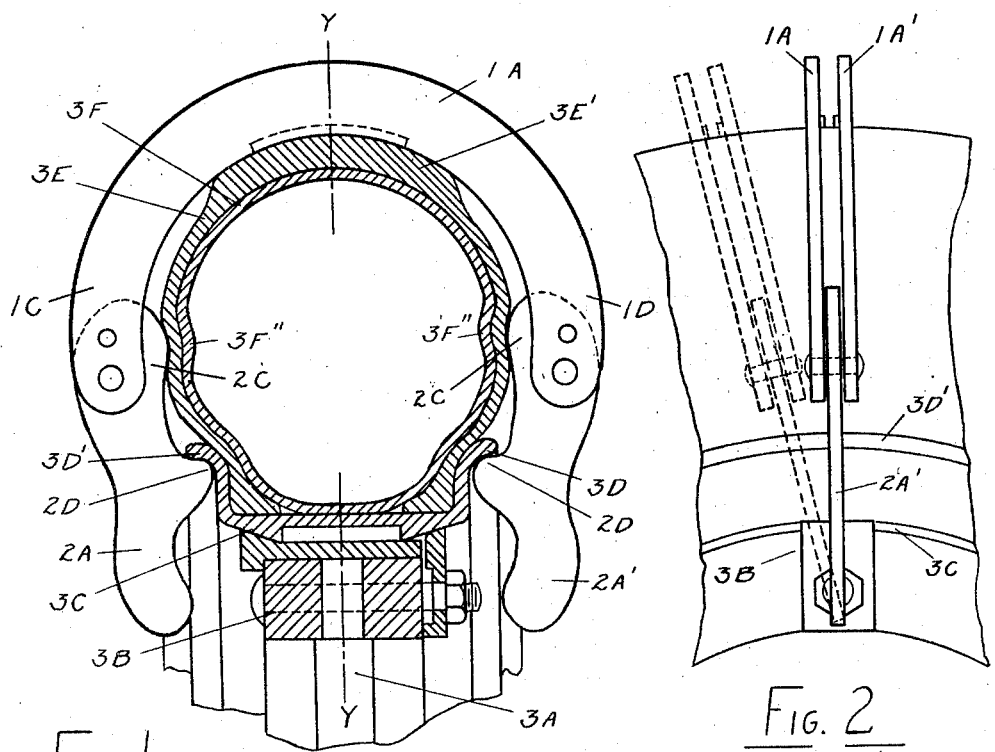
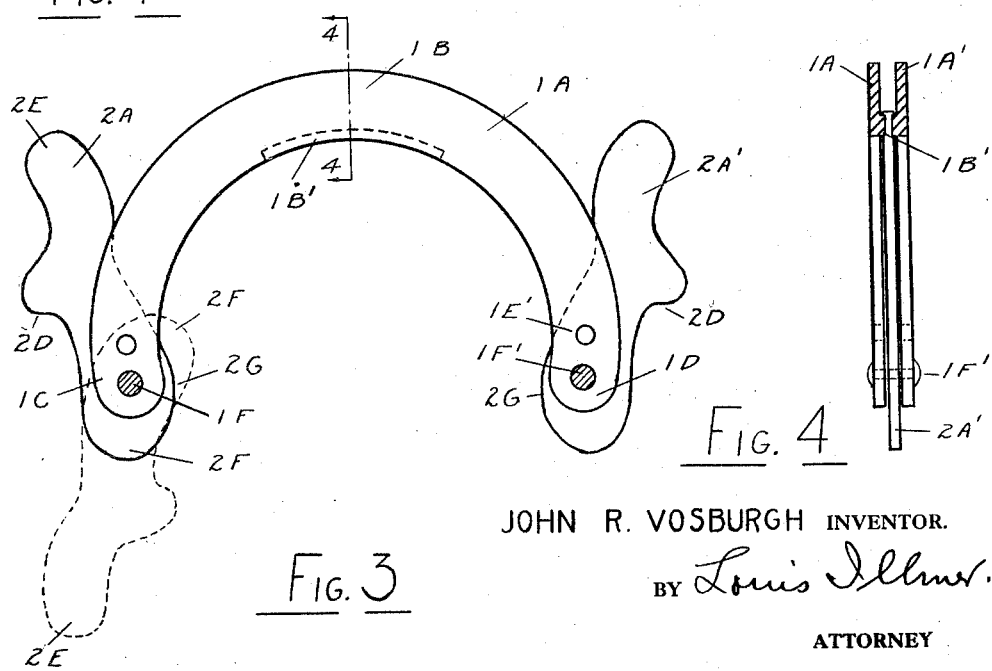

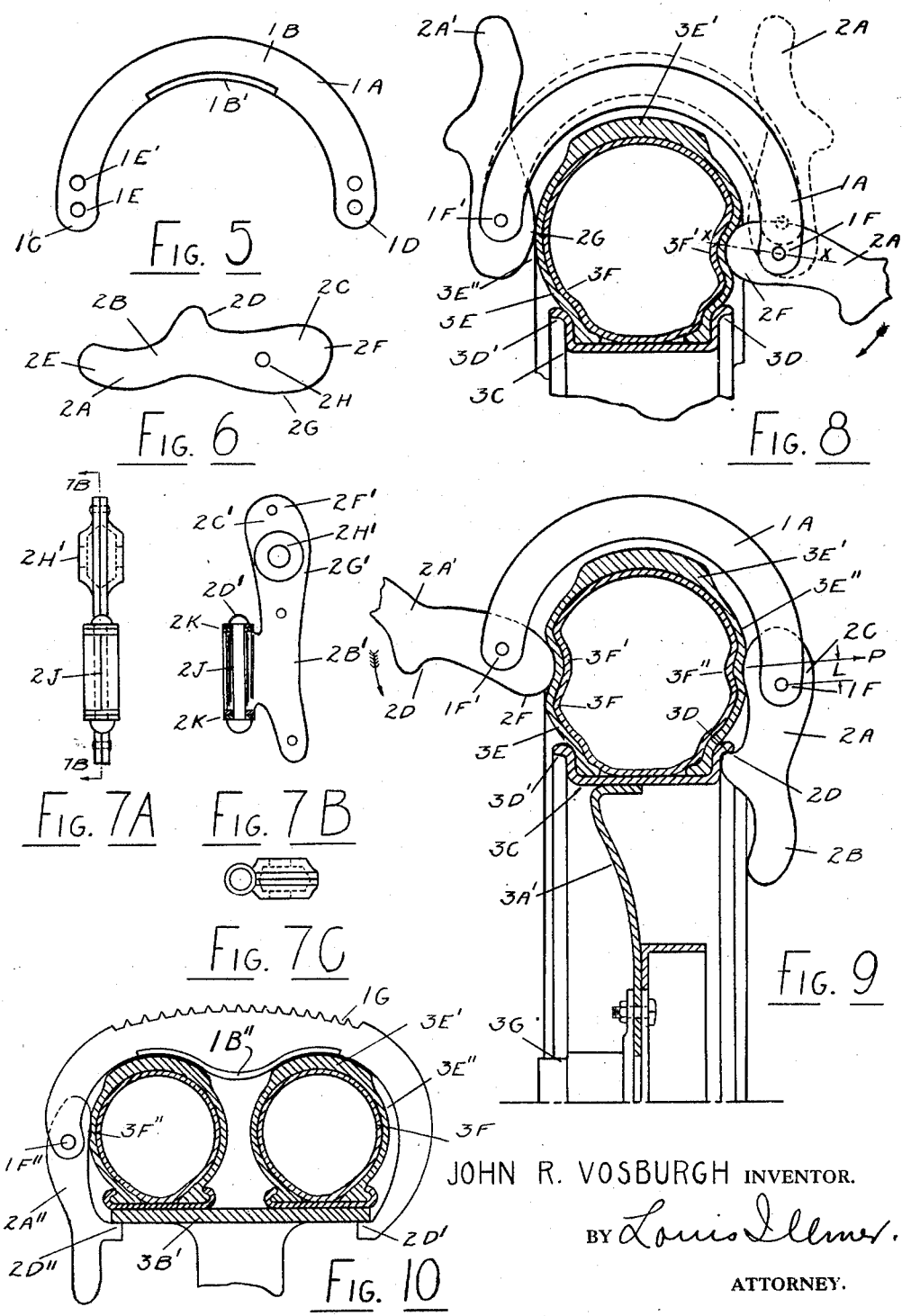

1,800,878

UNITED STATES PATENT OFFICE

JOHN R. VOSBURGH, OF JOHNSTOWN, NEW YORK

TRACTION DEVICE FOR VEHICLE TIRES

Application filed July 27, 1927. Serial No. 208,863.

My invention relates to traction calk means or so-called mud hooks adapted to be individually mounted upon a vehicle tire for road gripping purposes, and more particularly pertains to a detachable tire collet or fin-like clamping pieces of which one or more may in emergency be applied crosswise of a resilient tire tread to overcome miring or stalling of a power-driven vehicle wheel. This auxiliary device is primarily intended to contact with and dig into the roadbed in order to obviate undue wheel slip and enable self-propelled vehicles to proceed over soft or sandy ground, also over snow-bound or other unusual roadbed conditions where the normal road grip of the drive wheels is likely to become partially or wholly lost or where ordinary traction methods otherwise prove inadequate to cope with an abnormal situation of the kind indicated. Said collets likewise prove serviceable when motor cars are obliged to run over poorly routed road detours directed over newly plowed fields, swampy ground especially after prolonged rain or where such roads lead up a rather steep hillside or the like.

In order to prevent the cited deficiency in traction, said collets are individually secured to the rear drive wheels either in spaced relation or placed immediately behind one another. Where a motor car is unable to steer itself out of a deeply rutted mud or snow-packed road, said device may also be usefully applied upon the front steering wheels, either on these alone or in conjunction with one or more rear wheel collets.

A further object of the present improvements is to provide for a collet of such construction that the transmission of strains from shocks coming thereon due to impact with the roadbed, is reduced to a minimum and in which the resiliency of the conventional pneumatic or other rubber-like tire serves to provide for a cushioning effect adapted to absorb a substantial portion of any hammer-like blow to which my collet under severe thrust conditions, is likely to be subjected.

It is also an important object to provide for a unitary tire collet that can readily but firmly be attached as a fixture to the usual motor-driven wheel rim in novel interlocked fashion without recourse to separate bolt or similar supplementary fastening means. The considerable trouble heretofore experienced in applying auxiliary traction devices of this character has restricted their more general use on automobiles or trucks, and an outstanding feature of my improved device resides in greatly facilitating its convenient application to and removal from a mired vehicle wheel. At the same time, my tire collet is kept simple, practical and reasonably cheap to manufacture especially as a sheet metal stamped product.

To this end, my jaw-type of collet may be equipt with a fairly rigid yoke-like member of any suitable cross-sectional profile preferably of bow-shaped contour adapted to be snugly appended to some portion of the tread profile of any given cushion tire in either a skewed or upright straddled relation with respect to the tread surface thereof. This fin-like yoke is preferably secured transversely of the tire tread by automatic or self-latching retaining means; for this purpose there may be pivoted to the respective ends of said yoke, complementary manipulative levers of the hook or similar keeper type of which their respective hook bills or ledge equivalent are adapted to swing inwardly toward the wheel hub into operative position and made to grip opposite sides of a suitable peripherial member of the wheel; it is however preferred to have said lever ledges engage beneath the endless outturned side or tail-like flanges of a demountable metal rim such as are now being generally used in connection with pneumatic wheel tires. In the present instance, the necessary collet securement is had without being obliged to pass any of its fastening means entirely around the rim nor between the spaced wheel spokes, and this expedient makes my device especially appropriate for use on wheels of the disk or similar type; even when used in conjunction with the conventional artillery wheel, it prevents defacing the spoke finish or otherwise marring any parts thereof.

A further feature of refinement resides in the use of a bell-crank type of manipulative keeper lever of which one such is pivoted between its leg extremities to each of said spaced yoke ends. Of the respective bell-crank levers, one leg thereof is preferably shaped into a tire engaging means having a smoothly rounded nose or cam-like toe respectively adapted to exert a toggled squeezing action against opposite tire sides; the resulting reaction of the resilient tire wall subjects the aforesaid legs to a fairly stiff spreading thrust and this in turn causes the complementary rim or wheel gripping lever ends to be sprung together which automatically maintains the respective ledge elements thereof in latched engagement with a contiguous felly or other rim element whenever my tire collet is operatively mounted on the wheel.

A further innovation resides in keeping the outermost rounded ends of the manipulative levers well spaced apart and in close adjacency to the respective side walls of the tire so that the contact therebetween may be localized and the engagement virtually confined to diametrically opposite side wall regions. The remaining coordination given to my collet retaining means is such that the reversely disposed lever hooks are subjected to a tighter grip with respect to the rim whenever the tread is made to run over said traction attachment and the resilient side walls are spread apart while a momentary tire load comes thereon.

When removed from the tire, a set of my assembled collets may be conveniently carried in the tool kit of a motor car; should the car become stuck or stalled, these devices will then be at hand for prompt application when either of the drive wheels first start to lose traction, that is to say prior to their having dug themselves too deep into a road pit. By mounting one or more of my tire collets upon the exposed portion of such a partially mired wheel, its upstanding yoke will upon forced rotation of the wheel, be made to sink into the soft surface of the wheel pit, whereupon the collet affords a suitable pry means for imparting augmented wheel traction whenever the car is given a forward or backward lurch under its own power. Such impetus is usually sufficient to pull the motor vehicle out of a deep wheel pit or at least to shove the wheel into another location likely to afford a more favorable bed surface for a renewed gripping of the collets.

It will be apparent that my tire collet likewise affords suitable means for enabling a motor vehicle to pull itself back upon a paved roadbed in case certain of the car wheels should have run over the road edge and become stuck in its adjacent softer shoulder siding, all without resorting to tow ropes or other assisting drag means.

The present invention represents a continuation in part of my co-pending application Serial No. 181,516 as filed April 6, 1927. Embodied herein are further features of structure and organization designed to accomplish the foregoing purposes, all of which will be set forth in detail hereinafter.

Reference is had to the annexed two-sheet drawings which illustrate a specific embodiment of my invention; like characters of reference indicate like parts and in which drawings:

Fig. 1 is a fragmental cross-sectional or profile view of a wheel rim assembly of the pneumatic type showing a tire collet constructed in accordance with my invention applied thereto, while Fig. 2 shows an elevational side view thereof.

Figs. 3 and 4 respectively represent plan and sectional side view assembly of a preferred embodiment of my collet device as it appears when removed from the tire with its pivoted keeper levers thrown upwardly toward the yoke crown and placed in readiness for attachment to another tire.

Fig. 5 shows in plan, suitable yoke details for my collet device. Fig. 6 outlines the contour of a plain keeper lever that may serve as hook means for said yoke while Figs. 7a to 7c are respective views of an alternative yoke keeper lever similar to that shown in Fig. 6 except that it is provided with adjustable hook means.

Figs. 8 and 9 respectively indicate the successive actuating steps by means of which my collet device may most conveniently be secured to a pneumatic tire.

Fig. 10 represents certain structural modifications of my collet device and an alternative mode of applying the same.

Referring now in detail to the drawings, the spaced complementary frame members of the integral type respectively designated 1A and 1A', may each be given a similar bow-like shape, adapted to be readily stamped out of sheet metal or formed up from a suitable strip of flat stock. These frames may comprise a pair of annularly shaped fin-like metal yoke straps each having an intermediate crown portion such as 1B which if desired, may be laterally reenforced somewhat by an inturned saddle shoulder 1B' that at the same time serves to round off the tread engaging inner edge of the yoke strap. Said straps terminate in opposed open yoke ends such as 1C and 1D, which ends are kept spaced apart in jaw-fashion and adapted to embrace a resilient tire therebetween in the manner indicated by Fig. 1. The respective yoke ends may each be provided with one or a series of spaced pivot holes such as 1E, 1E' etc., and a pivot bolt, rivet or other suitable keeper lever fulcrum means 1F may be mounted therebetween through one set of such aligned holes and made to hold together the yoke strap ends into a unitary frame structure as shown assembled in Figs. 3 and 4. It will be understood however, it is not essential to employ a pair of spaced yoke straps as described, since said member 1F may likewise be secured to but one of said yokes as an overhanging fulcrum for mounting a keeper lever thereon without need of double yokes.

The complementary keeper or retaining levers 2A and 2A' may be given a similar shape and respectively mounted to rotate upon the fulcrums 1F or 1F'. The particular outline given said levers is immaterial but it is preferred to have them generally take the stamped contour defined in Fig. 6; this plain sheet metal lever conforms to the flat bellcrank type having a fulcrum aperture 2H preferably disposed intermediate the extremity of its legs 2B and 2C, the first named leg being provided with a fixed offset ledge carrying the hook edge or face 2D adapted to interlockingly engage with the rim felly or other suitable wheel portion but preferably with the outturned metal side or tail flanges such as 3D or 3D' which are usually given an undamageable galvanized finish; said lever is here shown as further equipt with a short finger piece 2E which non-essential expedient may be used for manipulating purposes.

The other lever leg 2C represents its tire engaging portion and this may be provided with a smoothly rounded nose or cam-like toe 2F adapted to exert a limited squeezing action against an adjacent tire side without cutting or otherwise marring the compressed face thereof. The riding edge portion 2G lying along the edge connecting the extremity of the lever toe 2F with the finger piece 2E and opposite to the hook edge 2D, is preferably rounded off adjacent to the lever fulcrum hub in order to more freely glide over the tire sides and facilitate drawing or rolling the collet yoke into operative position as will appear presently. Each of said levers is intended to swing from its full lined position shown in Fig. 3 (which represents the initial or innermost lever position ready for tire attachment) into the outermost or operative position as indicated by dotted lines for one of said levers.

The various views in Figs. 7a to 7c inclusive show a modified retaining lever structure in that its offset tire engaging leg 2B' is here formed by means of two complementary socketed parts adapted to be adjoined for carrying an adjustable hook ledge 2D' arranged to change its pitch distance with respect to said fulcrum aperture 2H'. The desired adjustment may be accomplished by the use of a rivet-like member 2J slidably embraced between suitable trough-shaped socketed lug parts. By placing a sufficient number of thin washers such as 2K under the rivet head, said hook ledge 2D' may readily be raised or lowered to meet requirements, whereupon the free rivet shank end may be fixedly swaged in place as indicated.

This last described lever is virtually interchangeable with the plain lever represented by Fig. 6, assuming both types to conform to the same overall dimensions. The provision for said hook ledge adjustment allows a particular yoke size to be more readily fitted to several different rim widths such as are conventionally being used in connection with a given tire profile. In marketing my tire collet, it is expedient to provide for a limited number of yoke sizes and then equip each of these with one or another of different sized keeper levers to make up various combinations of completed yokes adapted to universally meet the trade demand on part of substantially all leading models of standard pneumatic car or truck tires.

Assuming both levers 2A and 2A' to be shifted into their innermost position as shown by full lines in Fig. 3 with their respective riding edges 2G forming an open rounded jaw therebetween, my collet is now ready to initially embrace a tire in the fashion indicated by dotted lines in Fig. 8. If one of the keeper levers such as 2A now be drawn downwardly toward the wheel hub into the horizontal position shown in full lines, this will actuate its projecting short toe piece 2F as a toggle linkage and serve to exert a considerable localized thrust against the exterior of the protective tire shoe 3E which in turn causes the side wall 3E'' of said shoe to be impressed to a certain degree against the counteracting air pressure existing within the encased inner tube 3F in the indented fashion shown at 3F'. Such shoe depression at the same time acts as a fulcrum recess for the lever toe and allows the spanning collet yokes to be drawn closer toward and virtually rolled upon the tread 3E', which peripheral tire portion normally bears upon the roadbed. Further downward movement on part of the lever 2A in the direction of the arrow will then carry the toe 2F upwardly through and past the dead center position X—X of its toggle movement and finally cause it to be snapped into its latched full-lined position as shown in Fig. 9. In this final or operative position, a portion of the tire engaging lever end 2C is intended to maintain contact with and hold a portion of the shoe side wall 3E'' in a partially indented relation but preferably to a lesser degree than prevailed under the previous impression 3F' but still impressed in the reduced fashion indicated at 3F''. The continued outward reaction of the pneumatic pressure on part of the inner tube 3F thereby sets up a clockwise thrust P having a leverage "L" about this particular lever fulcrum which causes the hook lever end 2B to be pressed inwardly toward the rim tail flange 3D and hence automatically retains the lever ledge 2D or 2D' in interlocked engagement underneath said endless flange.

Having latched said lever 2A in place as described, it is preferred to follow up with the manipulation of the complementary keeper lever 2A' in a corresponding manner. This step is illustrated in Fig. 9 where the last named lever when swung in the direction of its arrow, is likewise made to impress the inner tube at 3F' and fulcrum thereon to still further draw or roll the collet yokes into place; after this second keeper lever has similarly interlocked with the wheel rim flange 3D', my collet finally assumes its seated operative position represented in Fig. 1, and this mode of grip fastening constitutes the primary means for positively retaining my detachable collet upon any peripherally disposed rim-like wheel member.

When my attached wheel collet reaches its bottom or loaded ground position, the consequent partial flattening of the tire in the collet region, tends to spread apart the free or tire contacting ends of my medially fulcrumed levers and this in turn causes the reversely disposed hook lever ends to more tightly grip the rim therebetween during the critical period when my collet is likely to be subjected to severe impact load.

Although it is preferred to have both keeper hooks rather snugly engage said rim flanges, it is not essential to hold my collet to exact tire dimensions; when loosely fitted, the collet is merely shifted into an oblique position under load such as shown in dotted lines in Fig. 2 and this serves to take up any ordinary slack due to any reasonable oversize that may be given to the collet parts. It will also be observed that since the pair of relatively thin flat yokes 1A and 1A' are held together only at their respective ends, such mounting allows for a certain amount of give or lateral yield between their respective spanning crown portions. While my collet is being utilized to heavily pull a vehicle out of the mire as described, the foremost or leading of these yoke fins is likely to be subjected to the brunt of load which tends to spring the yoke crowns toward the other; the resulting clamping of the yoke members in turn sets up a lateral binding action upon the intermediate keeper sides and during this exigency, such momentary abnormal friction step up about the respective lever fulcrums serves to supplement the lever holding power of the aforesaid pneumatic moment P, as desired.

After my collets have served their intended emergency purposes, they can readily be removed by reversing the described operations and pulling the respective inturned lever legs outwardly and away from the wheel plane when the yoke will be freed for subsequent application as needed.

Referring further to Fig. 9, this represents a disk wheel comprising the usual rim 3C as carried by a substantially closed disk member 3A, and the center of which disk may be provided with a hub 3G. It is emphasized that the use of such a closed disk does not interfere with the application of my collet device since the manipulative ends of my interlocking keeper levers need not be bodily tied together by extraneous fastening means that must pass between the wheel spokes in the conventional manner.

As will be obvious, my improved mode of collet attachment is subject to a rather wide modification and adapted to be used on different kinds and sizes of cushion tired wheels. It is preferred however to work with low pressure or balloon tires having relatively thin shoe side-walls such as have now come into almost universal use for passenger cars and the like. In the event that high pressure or cord tires are to be fitted with my device, it is expedient to reduce the described toggled toe leverage in order to avoid excessive indentation of the shoe sides as compared with that allowable in the case of balloon tires.

Furthermore, it is not essential that each of my yoke ends be equipt with a separate keeper lever; as will appear from Fig. 10, one of these ends may itself be disposed to constitute an integral or similar fixed type of hook member adapted to grip the rim or any other suitable wheel portion, while the other yoke end is equipt with the shiftable lever ledge means previously described and this one lever is sufficient to bring about the desired retraction between said modified rim gripping elements. The provision for a double ended yoke grip securely adjoins my centrally loaded fin-like member to the wheel tread and serves to give a fairly rigid support to both ends of said cross beam member; as a result, a lighter yoke heft may be used without subjecting the same to undue twist or bending while under load and if need be, the strap may be given augmented lateral rigidity by means of the saddle shoulder 1B'.

Fig. 10 further shows this modified collet of the single lever type applied to a set of dual tires equipt with a pair of clincher rims mounted in a closely adjacent relation upon a common felly 3B' such as is frequently used in connection with heavy trucks and bus traction wheels; if desired, the outermost crown edge of the yoke may be serrated at 1G to facilitate its grip upon ice or other slippery road ruts. Where a wheel rim is not provided with the usual outstanding tail-like flanges or its equivalent, the hook element of my collet device may similarly be made to contact any reasonably sharp felly ledge or other suitable rim-like portion of a tired wheel.

Solid tired wheels possessing sufficient resiliency or cushioning effect, may likewise be fitted with my collets embodying the same underlying principles of operation although in that event, it may be necessary to alter the arrangement of parts and also the allowable degree of tire indentation to suit circumstances.

It will be seen therefore that I have devised an improved tire collet of the character indicated that can readily be snapped in place and securely held upon a resilient tire for emergency traction purposes and that may thereupon be removed with equal facility. Although specific embodiments have herein been set forth in detail, I do not wish to be limited to the illustrative examples since recourse may readily be had to various change in arrangement or form of component parts, all without departing from the underlying principles embraced in the spirit and scope of my invention, heretofore described and more particularly pointed out in the appended claims.

Claims—

1. A fixate traction device adapted to be attached to a vehicle wheel equipt with a rim and a resilient tire providing for complementary side-walls, said device comprising a yoke-like collet adapted to transversely straddle and seat upon the tire tread, and a pair of manipulative levers respectively associated with the collet end portions, each such complementary lever having a hook element adapted to swing beneath said rim into interlocked operative position and further having a cam-like element adapted to impress a recess into one of the respective tire side-walls serving to initially draw one of the yoke ends toward its seated position when the lever associated therewith is swung into operative position.

2. A fixate traction device adapted to be attached to a vehicle wheel equipt with a rim and a resilient tire, said device comprising collet means including a pair of spaced complementary yoke straps the respective crown portions of which are laterally yielding and adapted in seated position to transversely straddle the tire tread, fulcrum means extending between each pair of spaced yoke ends, a relatively flat lever mounted upon each of the fulcrums and adapted to reversely hook beneath said rim member, and means retaining said hooked levers against collet displacement.

3. A traction device for a vehicle wheel equipt with a pneumatic tire and a tire mounting rim having diverging flanges, said traction device comprising a saddle adapted to seat upon the tire tread with its end portions disposed in opposition to the side walls of the tire, a lever pivoted intermediate its ends for each end portion of the saddle, each such lever having one leg thereof provided with lug means adapted to engage beneath the flange of a rim while the opposite leg thereof is kept in contact with and subject to the pressure of the side wall of the tire for lug retaining purposes, the disposition of the parts being such that widening of the tire under load will press apart the tire contacting lever legs and cause the respective lever lugs more tightly to engage said rim.

4. A traction device adapted to be attached to a vehicle wheel equipt with a resilient tire and also a tire mounting rim provided with diverging flanges, said device comprising a yoke-like collet adapted to seat astride the tire tread with the collet terminal portions disposed in adjacency to the respective sidewall regions of said tire, and flange gripping means associated with the respective collet terminal portions of which means one such includes a lever that is pivoted intermediate its ends and of which lever one leg is adapted to retractably interlock with a rim flange while the other lever leg is kept in cooperative contact with its adjacent tire side wall and serves to retain the collet in operative position, the disposition of parts being such that a widening of the tire under load will press outwardly the tire contacting leg and cause both of the aforesaid gripping means to more firmly engage the rim flange.

5. A fixate traction device adapted to be attached to a vehicle wheel equipt with a rim and a resilient tire, a collet seated transversely of the tire, retaining means including a manipulative lever fulcrumed upon said collet, said lever having a retractable hook portion adapted to grip beneath said rim while another lever portion cooperatively bears against said tire for hook retaining purposes, the disposition of said lever being such that a widening of the tire under load will press outwardly the tire engaging lever portion and cause the retractable hook lever portion to more tightly engage the rim, and means adjustably associating said lever and collet to adapt the device for use on different sized tires.

In testimony whereof, I have herewith set my hand this 25th day of July, 1927.

JOHN R. VOSBURGH.